US010525856B2

(12) United States Patent
Hasegawa et al.

(10) Patent No.: US 10,525,856 B2
(45) Date of Patent: Jan. 7, 2020

(54) VEHICLE SEAT

(71) Applicants: TACHI-S CO., LTD., Tokyo (JP); HONDA MOTOR CO., LTD., Tokyo (JP)

(72) Inventors: Yousuke Hasegawa, Tokyo (JP); Sigeyuki Okamoto, Tokyo (JP); Hiroyuki Yajima, Tokyo (JP); Shogo Wakana, Tokyo (JP); Osamu Kyogoku, Saitama (JP); Sugiaki Yamazato, Saitama (JP); Toru Inagaki, Saitama (JP)

(73) Assignees: TACHI-S CO., LTD., Tokyo (JP); HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/139,925

(22) Filed: Sep. 24, 2018

(65) Prior Publication Data
US 2019/0092201 A1 Mar. 28, 2019

(30) Foreign Application Priority Data

Sep. 25, 2017 (JP) .................. 2017-184023

(51) Int. Cl.
B60N 2/68 (2006.01)
B60N 2/20 (2006.01)

(52) U.S. Cl.
CPC .............. B60N 2/682 (2013.01); B60N 2/688 (2013.01); B60N 2/20 (2013.01)

(58) Field of Classification Search
CPC .......... B60N 2/682; B60N 2/68; B60N 2/688; B60N 2/20; B60N 2/22

USPC ....................................... 297/452.18
See application file for complete search history.

(56) References Cited

U.S. PATENT DOCUMENTS

| 9,039,094 | B2 * | 5/2015 | Yamada | B60N 2/682 |
| | | | | 297/452.18 |
| 2001/0052724 | A1 * | 12/2001 | Kamper | B60N 2/4228 |
| | | | | 297/452.2 |
| 2003/0098601 | A1 * | 5/2003 | Minai | B60N 2/06 |
| | | | | 297/452.19 |
| 2008/0129097 | A1 * | 6/2008 | Kowal | A47C 4/02 |
| | | | | 297/284.4 |

(Continued)

FOREIGN PATENT DOCUMENTS

JP 2013-193586 A 9/2013
JP 2016-074299 A 5/2016

Primary Examiner — Milton Nelson, Jr.
(74) Attorney, Agent, or Firm — Paratus Law Group, PLLC

(57) ABSTRACT

A vehicle seat includes: a seat back; and a seat cushion including: a first side frame; a second side frame; a front frame connecting front end portions of the first side frame and the second side frame to each other; and a rear frame connecting rear end portions of the first side frame and the second side frame to each other. The first side frame includes: a frame member including a closed sectional shape part between the front frame and the rear frame; a first reinforcing member being provided between the front frame and the rear frame to pass through an inner side wall and an outer side wall, and being joined with the inner side wall and the outer side wall; and a connection member connecting an end portion of the first reinforcing member with at least one frame of the front frame and the rear frame.

6 Claims, 6 Drawing Sheets

(56) References Cited

U.S. PATENT DOCUMENTS

| | | | |
|---|---|---|---|
| 2008/0277993 A1* | 11/2008 | Blankart | B60N 2/682 297/452.18 |
| 2008/0309144 A1* | 12/2008 | Hori | B60N 2/3013 297/452.59 |
| 2013/0249267 A1 | 9/2013 | Hosokawa | |
| 2016/0052437 A1* | 2/2016 | Hoshi | B60N 2/682 297/452.18 |

* cited by examiner

VEHICLE SEAT

CROSS-REFERENCE TO RELATED APPLICATION(S)

This application is based upon and claims the benefit of priority from Japanese Patent Application No. 2017-184023, filed on Sep. 25, 2017, the entire contents of which are incorporated herein by reference.

BACKGROUND

1. Field of the Invention

The present invention relates to a vehicle seat.

2. Description of the Related Art

A so-called belt-in seat in which a retractor of a shoulder belt is embedded is known as a seat which is mounted in a vehicle such as an automobile. In the belt-in seat, an outlet of the shoulder belt is provided in one shoulder of a seat back, and a belt guide which guides the shoulder belt to the outlet is supported by a back side frame which is arranged on one shoulder side on which the outlet is provided. The back side frame is connected with a cushion side frame which is arranged on the same side through a recliner.

The shoulder belt is locked by the retractor at the time of vehicle collision, for example, and an upper body of an occupant is restrained by the locked shoulder belt.

However, at that time, a relatively large load is applied to the back side frame which supports the belt guide and a cushion side frame which is connected with the back side frame. The load is applied such the back side frame is bent and twisted to the front side of the seat. In addition, the load is applied such that the cushion side frame is bent, and the rear end portion of the cushion side frame in which the recliner is attached is displaced in the seat width direction.

As for the load, a seat is known in which the back side frame is formed in a hollow and closed sectional shape so as to improve frame strength of the back side frame (for example, see JP-A-2013-193586). Further, a seat is also known in which also the cushion side frame is formed in a hollow and closed sectional shape, so as to improve frame strength of the cushion side frame (for example, see JP-A-2016-74299).

In the seat described in JP-A-2016-74299, in the front end portion of the cushion side frame having a hollow and closed sectional shape, a cushion front frame is joined with the inner (other cushion side frame side) side wall and the outer (the opposite side to the other cushion side frame side) side wall of the cushion side frame. In addition, in the rear end portion of the cushion side frame, the cushion rear frame is joined with the inner side wall and the outer side wall of the cushion side frame. Thus, the cushion side frame is reinforced.

However, the load which bends the cushion side frame may cause the collapse of the closed sectional shape of the cushion side frame in the central portion between the front end portion and the rear end portion of the cushion side frame. Further, strength of the cushion side frame is decreased prominently when the closed sectional shape collapses. In the seat described in JP-A-2016-74299, there is a concern that the central portion of the cushion side frame is not reinforced so that frame strength is insufficient.

SUMMARY

The invention is made in consideration of the above situation, and an object thereof is to improve frame strength of a vehicle seat.

According to an aspect of the invention, there is provided a vehicle seat including: a seat back in which an outlet of a shoulder belt is provided in one shoulder of the seat; and a seat cushion connected with the seat back through a recliner, wherein: the seat cushion includes: a pair of side frames, extending in a front and rear direction and, in which the recliner is attached in a rear end portion, the pair of side frames being a first side frame which is arranged on the one shoulder side of the seat back and a second side frame which is arranged on the other shoulder side of the seat back; a front frame connecting respective front end portions of the first side frame and the second side frame to each other; and a rear frame connecting respective rear end portions of the first side frame and the second side frame to each other; the first side frame includes: a frame member including a closed sectional shape part formed in a hollow and closed sectional shape between the front frame and the rear frame; a first reinforcing member being provided between the front frame and the rear frame to pass through an inner side wall of the closed sectional shape part on the second side frame side and an outer side wall on an opposite side to the second side frame side, and being joined with the inner side wall and the outer side wall; and a connection member connecting an end portion of the first reinforcing member which protrudes from the inner side wall toward an outside of the closed sectional shape part with at least one frame of the front frame and the rear frame.

According to the aspect of the invention, frame strength of the vehicle seat can be improved.

DETAILED DESCRIPTION OF THE INVENTION

Figure 1:
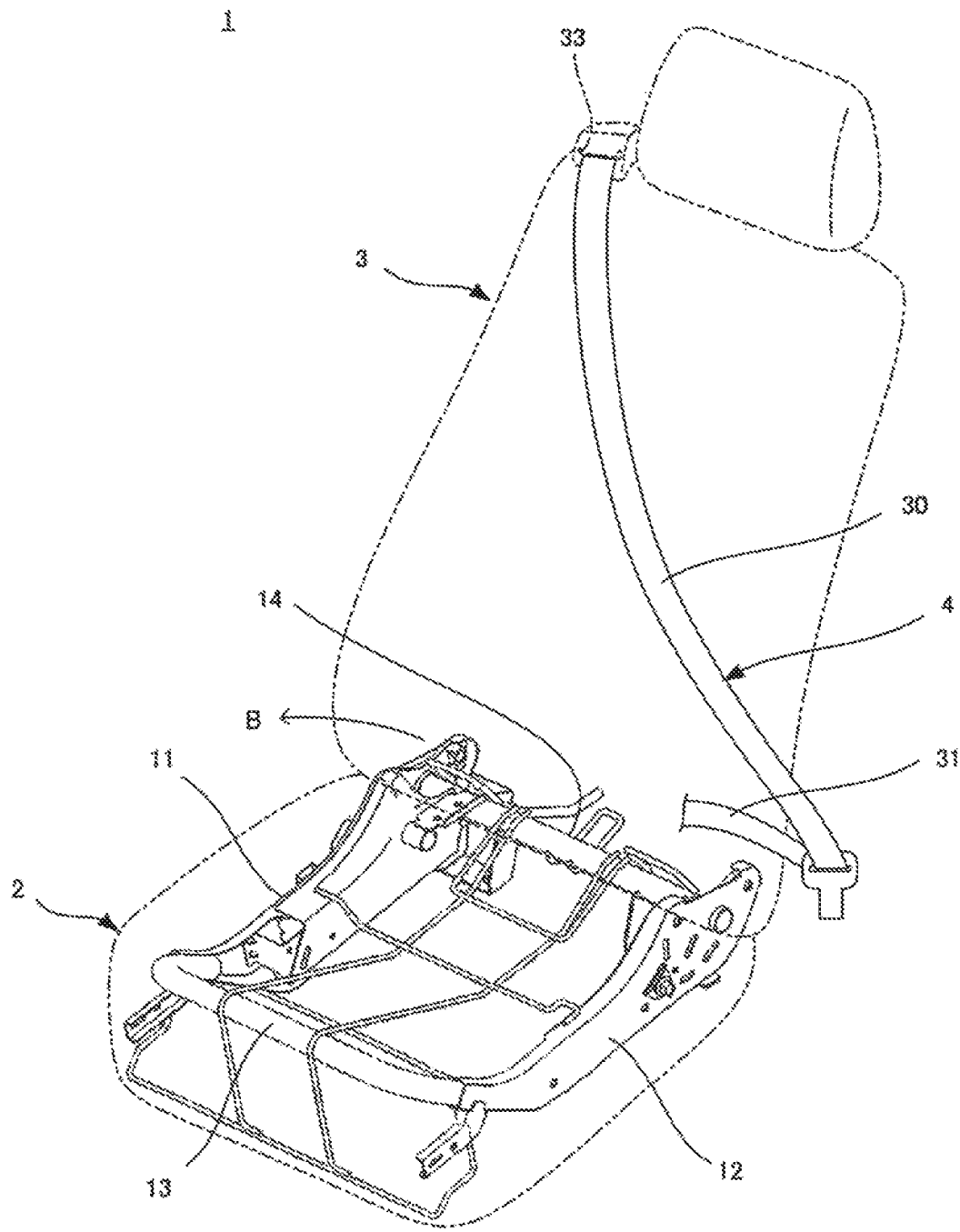
FIG. 1 is a perspective view of one example of a vehicle seat for explaining an embodiment of the invention.
Figure 2:
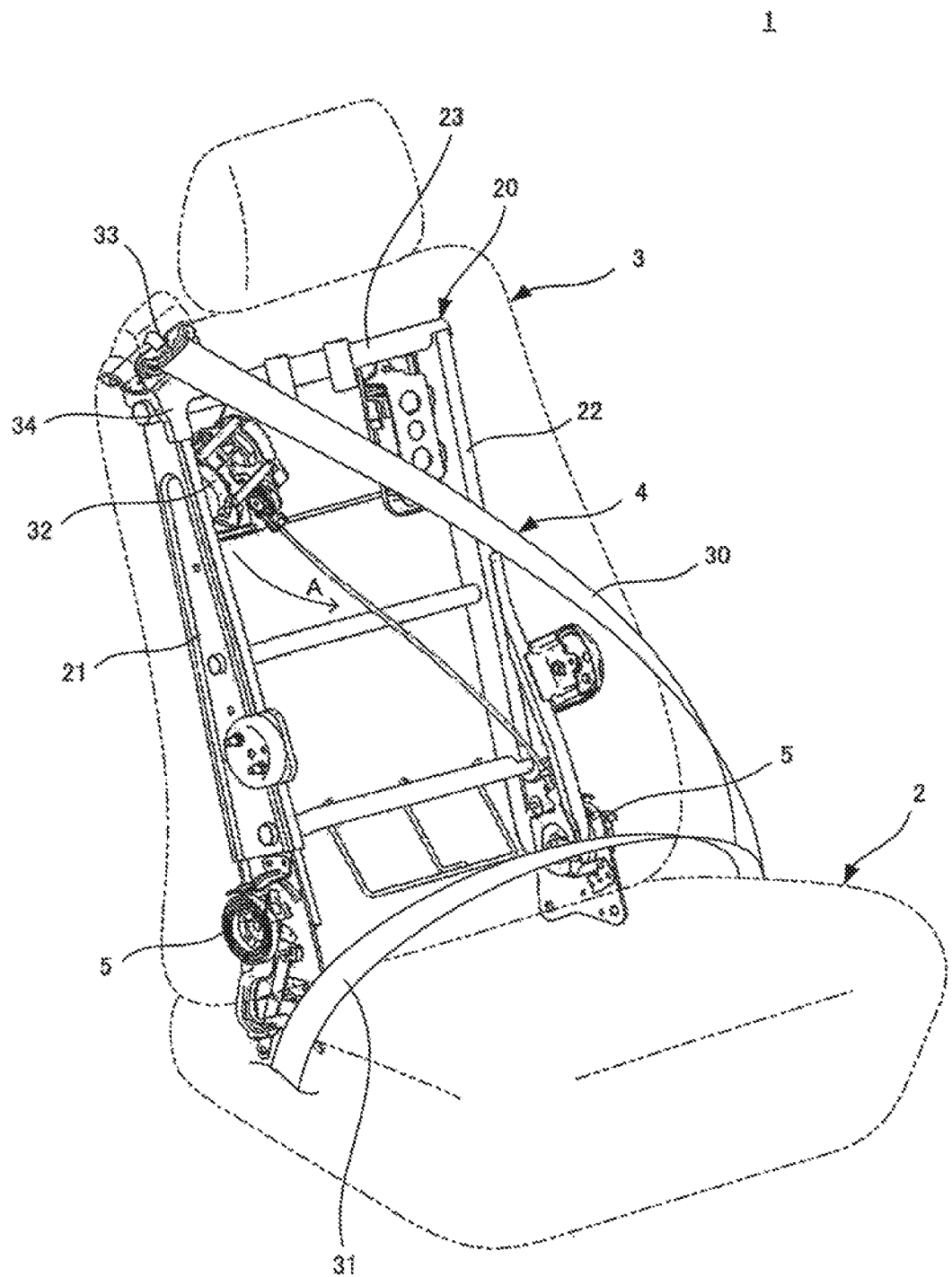
FIG. 2 is a perspective view of the vehicle seat of FIG. 1.
Figure 3:
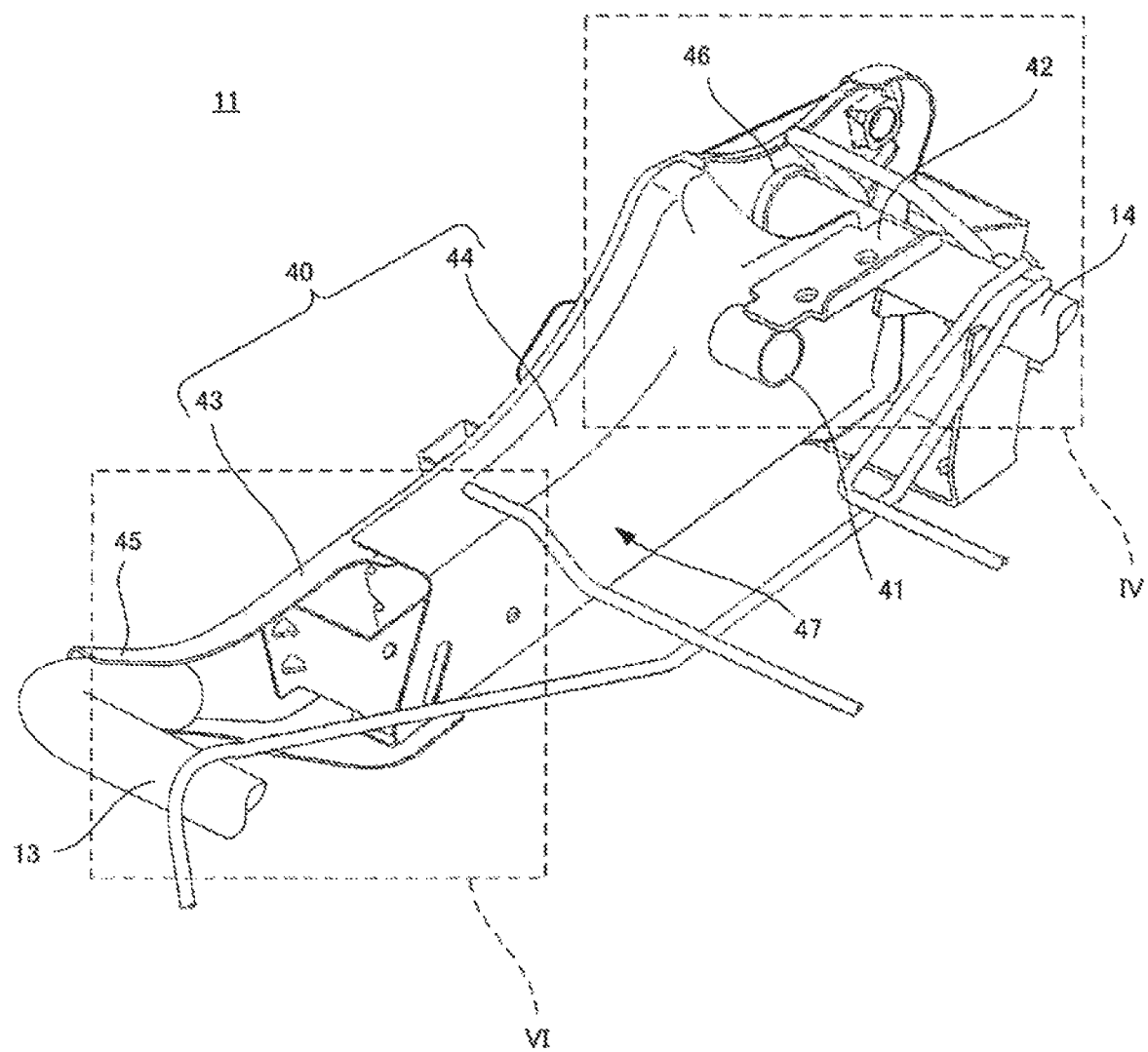
FIG. 3 is a perspective view of a first side frame of a seat cushion of the vehicle seat of FIG. 1.
Figure 4:
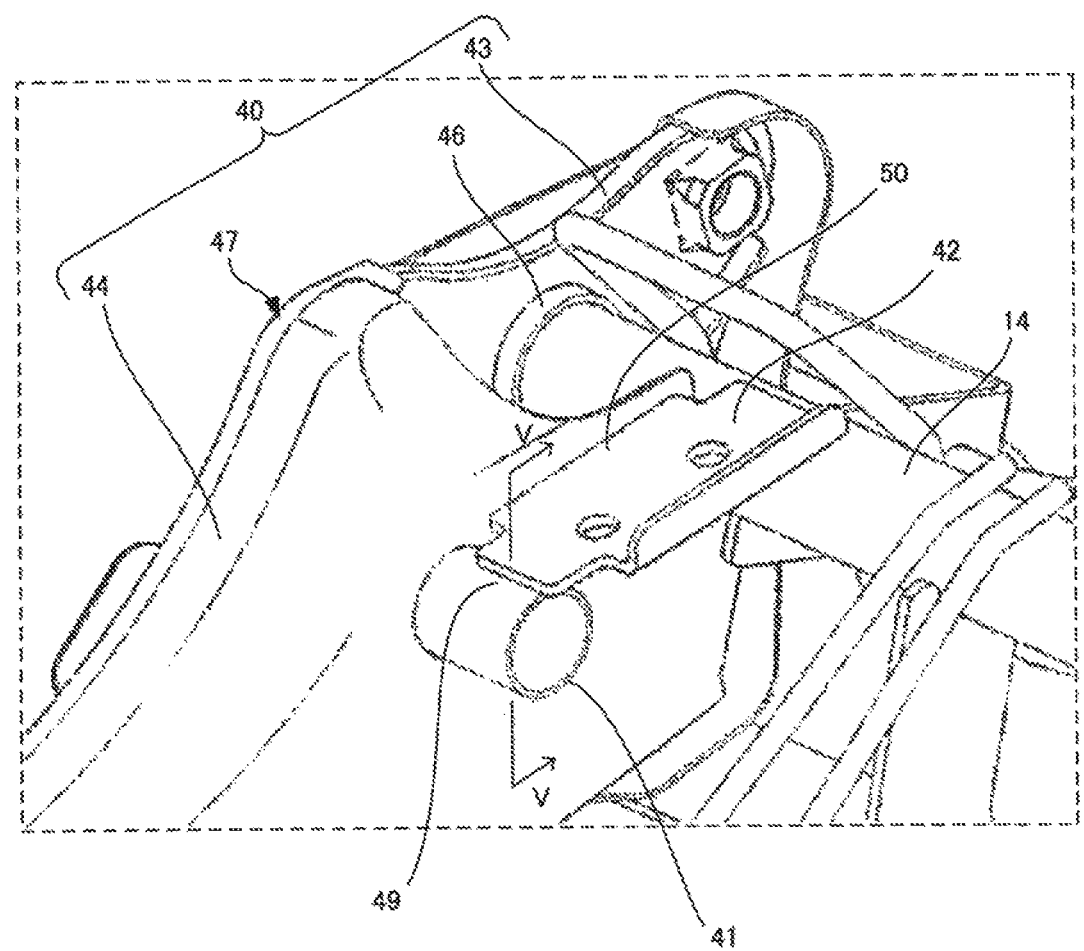
FIG. 4 is an enlarged view of a portion surrounded by broken line frame IV of FIG. 3.

FIGS. 1 and 2 illustrate one example of a vehicle seat for explaining an embodiment of the invention.

A seat 1 is a vehicle seat which is mounted in a vehicle such as an automobile. The seat includes a seat cushion 2 which supports a hip part and a thigh part of an occupant sitting on the seat, a seat back 3 which supports a lumbar part and a back part of the occupant, and a seat belt 4 for restraining the occupant to the seat cushion 2 and the seat back 3.

The seat cushion 2 includes a cushion frame 10 forming a frame of the seat cushion 2. A cushion frame 10 includes a pair of cushion side frames 11 and 12 which are arranged with a gap in a seat width direction and extend in a seat front/rear direction, a front frame 13 which connects respective front end portions of the pair of cushion side frames 11 and 12 to each other, and a rear frame 14 which connects respective rear end portions of the pair of cushion side frames 11 and 12 to each other. The cushion frame 10 is covered with a cushion pad which is made of a relatively soft foam resin material such as urethane foam, and further with a trim cover which is made of skin material such as leather, woven fabric, and non-woven fabric.

The seat back 3 includes a back frame 20 forming a frame of the seat back. The back frame 20 includes a pair of back side frames 21 and 22 which are arranged with a gap in the seat width direction and extend in a seat vertical direction, and an upper frame 23 which connects the respective upper end portions of the pair of back side frames 21 and 22 to each other. Further, similar to the cushion frame 10 of the seat cushion 2, the back frame 20 is also covered with a cushion pad and a trim cover.

The lower end portion of the back side frame 21 is connected with the cushion side frame 11 on the same side through a recliner 5. The back side frame 22 is also connected with the cushion side frame 12 on the same side through the recliner 5. The seat back 3 is tiltable with respect to the seat cushion 2 in the seat front/rear direction and is held by an adjusted tilt angle by the recliner 5.

The seat belt 4 is a so-called three point type seat belt. The seat belt includes a shoulder belt 30 which is laid obliquely from one shoulder (in the illustrated example, the right shoulder) among left and right shoulders of the occupant sitting on the seat 1 to the lumbar part, and a lap belt 31 which is wound continuously from the shoulder belt 30 to the lumbar part of the occupant. Further, a retractor 32 which winds the shoulder belt 30 and the lap belt 31 is embedded into the seat back 3, and the retractor 32 is fixed in the upper frame 23.

The retractor 32 is a so-called emergency locking retractor. The retractor is configured to stop the shoulder belt 30 being sent out, for example, in a case where a drastic deceleration occurs due to a vehicle collision or the like. Incidentally, the retractor 32 may have a function of a so-called pretensioner which automatically winds the shoulder belt 30 in the case of a drastic deceleration or the like so as to actively restrain the occupant. In addition, the retractor 32 may have a function of a so-called force limiter which sends out the shoulder belt 30 gradually to loosen the restraining of the occupant when an excessive tensile load acts on the shoulder belt 30.

An outlet 33 of the shoulder belt 30 is provided in one shoulder of the seat back 3 which supports the right shoulder of the occupant. A belt guide 34 which guides the shoulder belt 30 sent out from the retractor 32 to the outlet 33 is attached in the upper end portion of the back side frame 21 which is arranged on the shoulder side on which the outlet 33 is provided.

In a case where a drastic deceleration occurs due to the vehicle collision or the like, the shoulder belt 30 is locked by the retractor 32. When the upper body of the occupant is restrained by the locked shoulder belt 30, the load is applied to the back side frame 21 in which the belt guide 34 is attached. As indicated by arrow A in FIG. 2, the load is applied such that the back side frame 21 is bent and twisted to the seat front side.

The load applied to the back side frame 21 is also applied to the cushion side frame (first side frame) 11 through the recliner 5. The load bends the cushion side frame 11 and acts such that the rear end portion of the cushion side frame 11 in which the recliner 5 is attached is displaced in the seat width direction as indicated by arrow B in FIG. 1.

FIGS. 3 to 6 illustrate the configuration of the cushion side frame 11.

The cushion side frame (first side frame) 11 includes a frame member 40, a first reinforcing member 41, and a connection member 42. The frame member 40 includes an outer plate 43 which is arranged on the opposite side to another cushion side frame (second side frame) 12 side, and an inner plate 44 which is arranged on the cushion side frame 12 side.

The outer plate 43 is formed such that the cross section perpendicular to the seat front/rear direction is an almost U-shaped hollow and open sectional shape. A front joint part 45 in which the front frame 13 is joined is provided in the front end portion of the outer plate 43, and a rear joint part 46 in which the rear frame 14 is joined is provided in the rear end portion of the outer plate 43.

The inner plate 44 is also formed such that the cross section perpendicular to the seat front/rear direction is an almost U shaped hollow and open sectional shape. Further, the hollow portion of the outer plate 43 and the hollow portion of the inner plate 44 are made to face each other, and the inner plate 44 is joined to the outer plate 43. The method of joining the outer plate 43 and the inner plate 44 can be exemplified by welding, brazing, and the like.

A closed sectional shape part 47 having a hollow and closed sectional shape is formed by the outer plate 43 and the inner plate 44 joined to each other. The inner plate 44 is arranged between the front joint part 45 and the rear joint part 46 of the outer plate 43, and the closed sectional shape part 47 is provided between the front joint part 45 and the rear joint part 46, that is, is provided between the front frame 13 and the rear frame 14.

Figure 5:
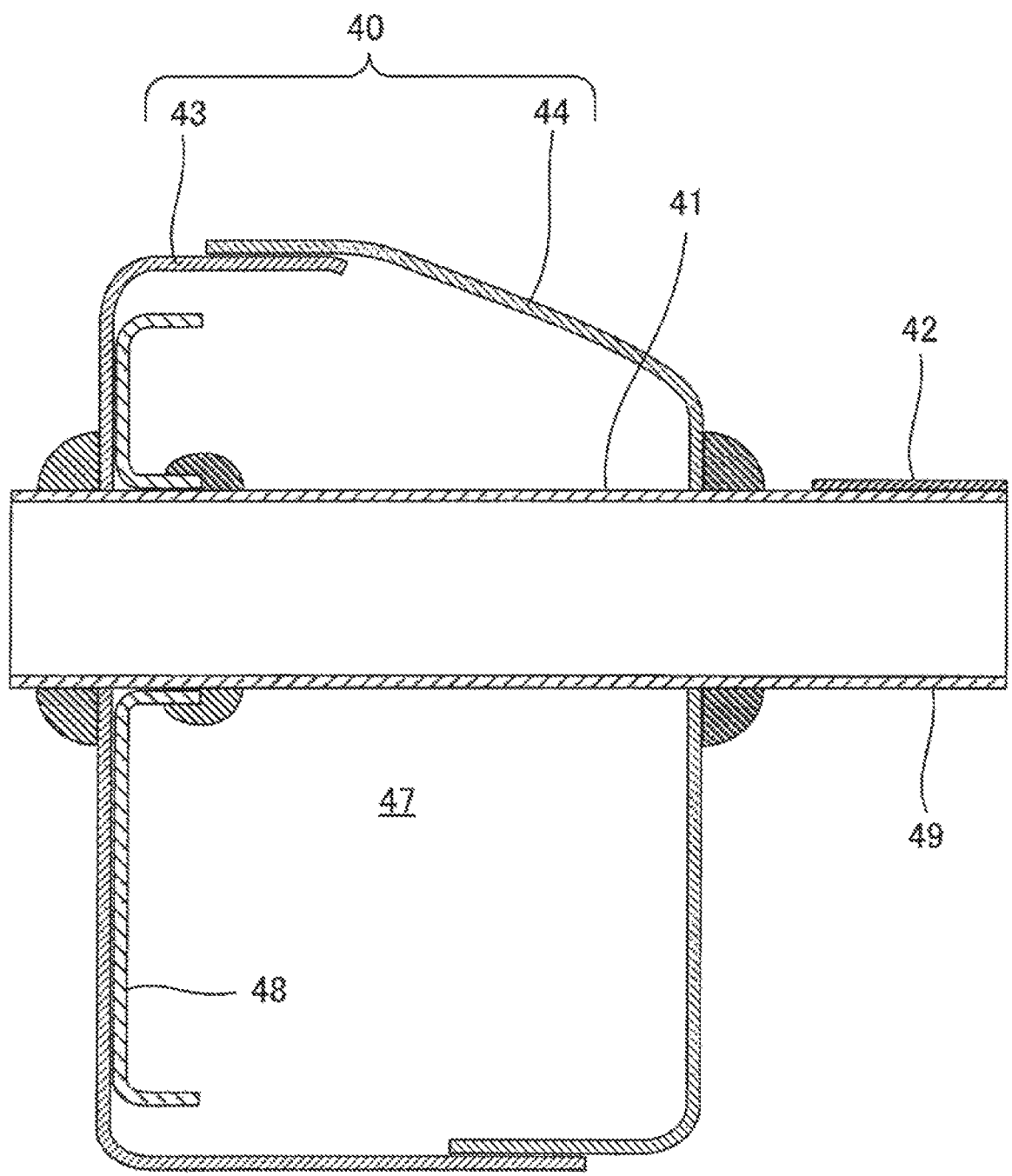
FIG. 5 is a sectional view taken along line V-V of FIG. 4.

As illustrated in FIG. 5, the first reinforcing member 41 is provided between the front frame 13 and the rear frame 14 to continuously pass through the outer plate 43 (outer side wall) and the inner plate 44 (inner side wall) forming the closed sectional shape part 47. Further, the first reinforcing member 41 is joined to the outer plate 43 and the inner plate 44. The method of joining the first reinforcing member 41 with the outer plate 43 and the inner plate 44 can be exemplified by welding, brazing, and the like.

For example, the load which bends the cushion side frame 11 buckles the outer plate 43 and/or the inner plate 44 toward inside the closed sectional shape part 47 so as to cause the collapse of the closed sectional shape. However, the first reinforcing member 41 continuously passes through the outer plate 43 and the inner plate 44 and is joined to the outer plate 43 and the inner plate 44 so that the outer plate 43 and the inner plate 44 restrain each other through the first reinforcing member 41. Accordingly, it is possible to inhibit the load from causing the collapse of the closed sectional shape, and it is possible to improve strength of the cushion side frame 11.

As long as the first reinforcing member 41 passes through the closed sectional shape part 47 between the front frame 13 and the rear frame 14, the arrangement of the first reinforcing member 41 with respect to the closed sectional shape part 47 is not limited particularly. For example, with respect to the load which bends the cushion side frame 11, the first reinforcing member 41 is arranged in a place where strength is weakest in the closed sectional shape part 47 (a place where the collapse of the closed sectional shape easily occurs). The place is set through a structural analysis and/or a product test by a simulation using a computer, for example.

The first reinforcing member 41 may be a rod material, a plate material, or the like. However, preferably, the first reinforcing member may be a pipe material in order to achieve both improving strength and reducing weight. Incidentally, in this example, a reinforcement plate 48 is joined to the outer plate 43 along the inner surface of the outer plate 43. The first reinforcing member 41 passes through the reinforcement plate 48 and is joined to the reinforcement plate 48. Accordingly, strength of the cushion side frame 11 is improved further.

One end portion 49 of the first reinforcing member 41 protrudes from the inner plate 44 toward the outside of the closed sectional shape part 47. The connection member 42 connects the end portion 49 of the first reinforcing member 41 with at least one frame among the front frame 13 and the rear frame 14. In this example, the end portion 49 of the first reinforcing member 41 is connected with the rear frame 14. The method of joining the connection member 42 with the first reinforcing member 41 and the rear frame 14 can be exemplified by welding, brazing, and the like.

As described above, when the outer plate 43 and the inner plate 44 restrain each other through the first reinforcing member 41, the load is inhibited from causing the collapse of the closed sectional shape, but the outer plate 43 and the inner plate 44 may be bent integrally in association with the displacement of the first reinforcing member 41. However, the displacement of the first reinforcing member 41 is inhibited when an almost rectangular frame body is constituted of the rear frame 14, the frame member 40 (the outer plate 43 and the inner plate 44), the first reinforcing member 41, and the connection member 42, and the shape of the frame body is maintained based on structural strength of the frame body. Accordingly, it is possible to further improve strength of the cushion side frame 11.

In this example, the connection member 42 is joined with the rear frame 14. However, the connection member may be joined with the front frame 13 or both of the front frame 13 and the rear frame 14. However, in order to reduce the seat 1 in weight, the connection member 42 is joined with any one frame of the front frame 13 and the rear frame 14. Preferably, the connection member is joined with the frame close to the first reinforcing member 41. The connection member 42 is joined with the frame close to the first reinforcing member 41, so as to improve strength of the frame body which is constituted of the frame close to the first reinforcing member 41, the frame member 40 (the outer plate 43 and the inner plate 44), the first reinforcing member 41, and the connection member 42.

Also preferably, a side edge part 50 of the connection member 42 which extends along the inner plate 44 is joined with the inner plate 44. Accordingly, it is possible to further improve strength of the frame body. The method of joining the connection member 42 and the inner plate 44 can be exemplified by welding, brazing, and the like.

Figure 6:
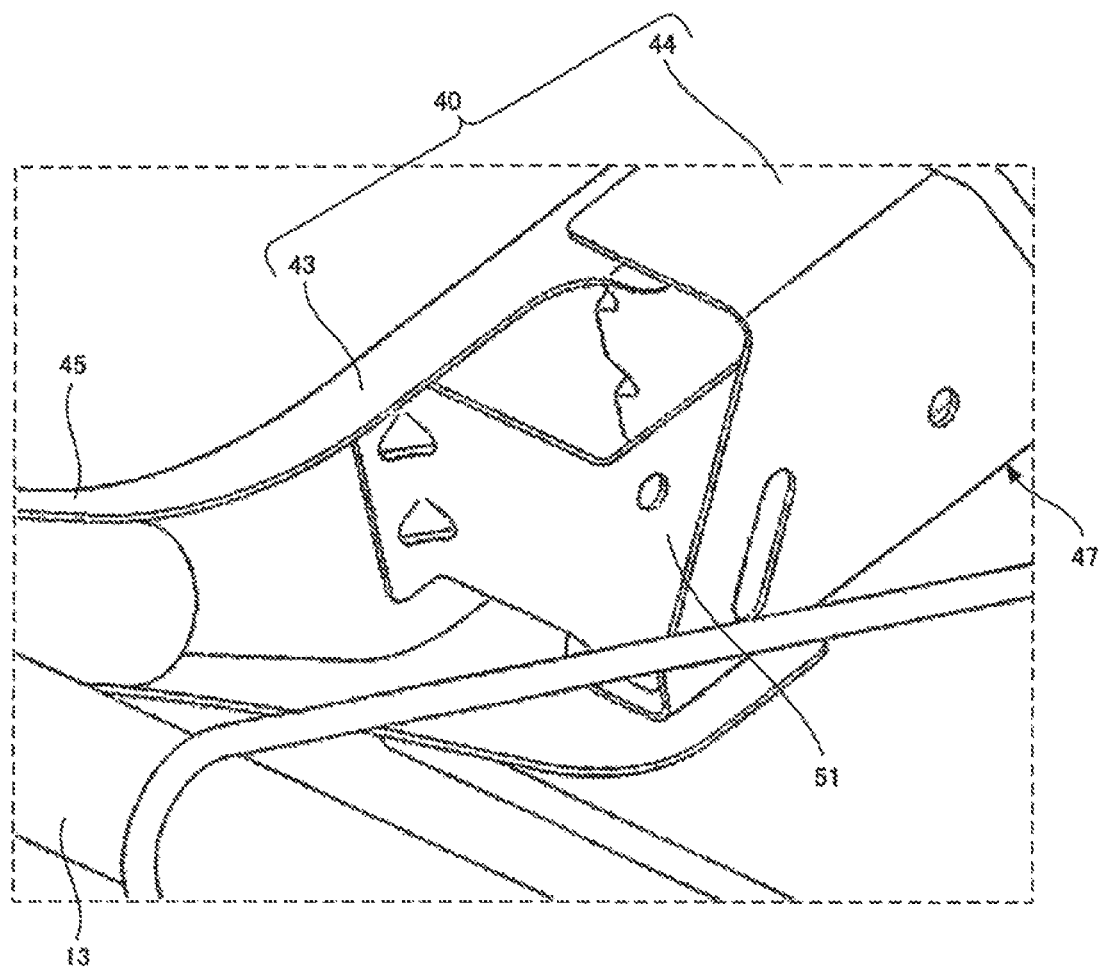
FIG. 6 is an enlarged view of a portion surrounded by broken line frame VI-VI of FIG. 3.

Also preferably, as illustrated in FIG. 6, the cushion side frame 11 includes a second reinforcing member 51 which is joined with the outer plate 43 and the inner plate 44 in a front opening part of the closed sectional shape part 47. When the outer plate 43 and the inner plate 44 is integrated through the second reinforcing member 51, it is possible to inhibit occurrence of the collapse of the closed sectional shape in the front opening part of the closed sectional shape part 47, and it is possible to inhibit spreading of the collapse of the closed sectional shape to the entire body with the front opening part as a starting point. Incidentally, in the example illustrated in FIG. 6, the second reinforcing member 51 is a member separate from the front frame 13. However, the second reinforcing member 51 may be substituted with the front frame 13, and in this case, it is possible to reduce the seat 1 in weight.

Similarly, the cushion side frame 11 may include a third reinforcing member which is joined with the outer plate 43 and the inner plate 44 in the rear opening part of the closed sectional shape part 47. The rear frame 14 can be used as the third reinforcing member.

Hereinbefore, the invention is explained by using the seat mounted in the vehicle such as an automobile as an example. However, the invention is not limited to the seat mounted in the vehicle and may be also applied to the vehicle seat other than the vehicle, such as an airplane and a ship.

As described above, the vehicle seat disclosed in this specification includes a seat back in which an outlet of a shoulder belt is provided in one shoulder, and a seat cushion which is connected with the seat back through a recliner. The seat cushion includes a pair of side frames which extend in a seat front/rear direction and in which the recliner is attached in a rear end portion, the pair of side frames being a first side frame which is arranged on the one shoulder side of the seat back and a second side frame which is arranged on the other shoulder side of the seat back, a front frame which connects respective front end portions of the first side frame and the second side frame to each other, and a rear frame which connects respective rear end portions of the first side frame and the second side frame to each other. The first side frame includes a frame member which includes a closed sectional shape part formed in a hollow and closed sectional shape between the front frame and the rear frame, a first reinforcing member which is provided between the front frame and the rear frame to pass through an inner side wall of the closed sectional shape part on the second side frame side and an outer side wall on an opposite side to the second side frame side and is joined with the inner side wall and the outer side wall, and a connection member which connects an end portion of the first reinforcing member which protrudes from the inner side wall toward an outside of the closed sectional shape part with at least one frame among the front frame and the rear frame.

In the vehicle seat disclosed in this specification, the connection member connects the end portion of the first reinforcing member with one frame, which is close to the end portion, of the front frame and the rear frame.

In the vehicle seat disclosed in this specification, the connection member is joined with the inner side wall.

In the vehicle seat disclosed in this specification, the first side frame includes a second reinforcing member which is joined with the inner side wall and the outer side wall in a front opening part of the closed sectional shape part, and a third reinforcing member which is joined with the inner side wall and the outer side wall in a rear opening part of the closed sectional shape part.

In the vehicle seat disclosed in this specification, the second reinforcing member is the front frame.

In the vehicle seat disclosed in this specification, the third reinforcing member is the rear frame.

What is claimed is:
1. A vehicle seat comprising:
a seat back in which an outlet of a shoulder belt is provided in one shoulder of the seat; and
a seat cushion connected with the seat back through a recliner, wherein:
the seat cushion includes:
a pair of side frames, extending in a front and rear direction and, in which the recliner is attached in a rear end portion, the pair of side frames being a first side frame which is arranged on the one shoulder side of the seat back and a second side frame which is arranged on the other shoulder side of the seat back;
a front frame connecting respective front end portions of the first side frame and the second side frame to each other; and
a rear frame connecting respective rear end portions of the first side frame and the second side frame to each other:

the first side frame includes:
a frame member including a closed sectional shape part formed in a hollow and closed sectional shape between the front frame and the rear frame;
a first reinforcing member being provided between the front frame and the rear frame to pass through an inner side wall of the closed sectional shape part on the second side frame side and an outer side wall on an opposite side to the second side frame side, and being joined with the inner side wall and the outer side wall; and
a connection member connecting an end portion of the first reinforcing member which protrudes from the inner side wall toward an outside of the closed sectional shape part with at least one frame of the front frame and the rear frame.

2. The vehicle seat according to claim 1, wherein
the connection member connects the end portion of the first reinforcing member with one frame, which is close to the end portion, of the front frame and the rear frame.

3. The vehicle seat according to claim 1, wherein
the connection member is joined with the inner side wall.

4. The vehicle seat according to claim 1, wherein
the first side frame includes:
a second reinforcing member being joined with the inner side wall and the outer side wall in a front opening part of the closed sectional shape part; and
a third reinforcing member being joined with the inner side wall and the outer side wall in a rear opening part of the closed sectional shape part.

5. The vehicle seat according to claim 4, wherein
the second reinforcing member is the front frame.

6. The vehicle seat according to claim 4, wherein
the third reinforcing member is the rear frame.

* * * * *